United States Patent
Yasuda

(10) Patent No.: US 12,005,844 B2
(45) Date of Patent: Jun. 11, 2024

(54) FLAT HARNESS ATTACHMENT STRUCTURE, FLAT HARNESS ATTACHMENT COMPONENT, AND ATTACHMENT COMPONENT-EQUIPPED FLAT HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Hisahiro Yasuda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 300 days.

(21) Appl. No.: 17/612,184

(22) PCT Filed: Feb. 14, 2020

(86) PCT No.: PCT/JP2020/005692
§ 371 (c)(1),
(2) Date: Nov. 17, 2021

(87) PCT Pub. No.: WO2020/240943
PCT Pub. Date: Dec. 3, 2020

(65) Prior Publication Data
US 2022/0242336 A1    Aug. 4, 2022

(30) Foreign Application Priority Data
May 31, 2019    (JP) ................. 2019-102139

(51) Int. Cl.
*B60R 16/02*    (2006.01)
*H01B 7/08*    (2006.01)
*H02G 3/04*    (2006.01)

(52) U.S. Cl.
CPC ....... *B60R 16/0215* (2013.01); *H01B 7/0823* (2013.01); *H02G 3/0406* (2013.01)

(58) Field of Classification Search
CPC .... H02G 3/32; H02G 3/0406; B60R 16/0215; B60R 16/02; H01B 7/0823; H01B 7/0838; F16B 2/12; F16B 13/02; F16B 5/06
(Continued)

(56) References Cited

U.S. PATENT DOCUMENTS

| | | | | | |
|---|---|---|---|---|---|
| 2,366,041 | A | * | 12/1944 | Morchouse | F16L 3/1233<br>248/68.1 |
| 5,895,889 | A | * | 4/1999 | Uchida | B60R 16/0207<br>174/72 A |
| 7,162,790 | B1 | * | 1/2007 | Daniels | F16L 3/04<br>29/525.04 |

(Continued)

FOREIGN PATENT DOCUMENTS

| | | |
|---|---|---|
| JP | S51-072199 U | 6/1976 |
| JP | S53-088799 U | 7/1978 |
| JP | S58-172327 U | 11/1983 |
| JP | H04-111394 A | 4/1992 |
| JP | H09-250521 A | 9/1997 |

(Continued)

OTHER PUBLICATIONS

International Search Report issued on Apr. 21, 2020 for WO 2020/240943 A1 (5 pages).

*Primary Examiner* — Timothy J Thompson
*Assistant Examiner* — Michael F McAllister
(74) *Attorney, Agent, or Firm* — Venjuris, P.C.

(57) ABSTRACT

An object of the invention is to be able to attach flat harnesses of varying widths to an attachment target portion. A flat harness attachment structure to be attached to an attachment target member having an attachment target surface includes: a flat harness to be installed on the attachment target surface; a fixing portion to be fixed to the attachment target member on one side portion side of the flat harness; and a pressing portion extending from the fixing portion over the flat harness so as to press the flat harness against the attachment target surface.

8 Claims, 3 Drawing Sheets

(58) Field of Classification Search
USPC .................................................. 174/72 A
See application file for complete search history.

(56) References Cited

U.S. PATENT DOCUMENTS

| 8,282,412 | B1 * | 10/2012 | Yaguchi | H01R 13/5804 |
| | | | | 439/492 |
| 9,004,415 | B2 * | 4/2015 | Fukumoto | F16B 19/1081 |
| | | | | 248/51 |
| 2012/0132465 | A1 * | 5/2012 | Mabuchi | B60R 16/0215 |
| | | | | 174/72 A |
| 2017/0292634 | A1 * | 10/2017 | Nguyen | F16M 13/02 |
| 2019/0088387 | A1 * | 3/2019 | Oshima | H01B 7/40 |

FOREIGN PATENT DOCUMENTS

| JP | H09-277853 A | 10/1997 |
| JP | 2001-268756 A | 9/2001 |
| JP | 2002-002411 A | 1/2002 |

* cited by examiner

FLAT HARNESS ATTACHMENT STRUCTURE, FLAT HARNESS ATTACHMENT COMPONENT, AND ATTACHMENT COMPONENT-EQUIPPED FLAT HARNESS

CROSS REFERENCE TO RELATED APPLICATIONS

This application is a national phase of PCT application No. PCT/JP2020/005692, filed on 14 Feb. 2020, which claims priority from Japanese patent application No. 2019-102139, filed on 31 May 2019, all of which are incorporated herein by reference.

TECHNICAL FIELD

The present disclosure relates to a flat harness attachment structure, a flat harness attachment component, and an attachment component-equipped flat harness.

BACKGROUND

Patent Document 1 discloses a structure in which a flat wiring member is routed on the rear surface of a panel. The panel is provided with a wiring groove. The flat wiring member is routed in the wiring groove. A clip has a pair of fixing claws, and the panel is provided with holes into which the pair of fixing claws are inserted. The pair of fixing claws are inserted into the pair of holes with the clip straddling the flat wiring member in the width direction thereof. Thus, the flat wiring member is fixed to the panel.

PRIOR ART DOCUMENT

Patent Document

Patent Document 1: JP H09-277853 A

SUMMARY OF THE INVENTION

Problems to be Solved

It is desirable to be able to attach flat harnesses of varying widths to an attachment target portion.

Thus, it is an object of the present disclosure to be able to attach flat harnesses of varying widths to an attachment target portion.

Means to Solve the Problem

A flat harness attachment structure according to the present disclosure is a flat harness attachment structure to be attached to an attachment target member having an attachment target surface, including: a flat harness to be installed on the attachment target surface; a fixing portion to be fixed to the attachment target member on one side portion side of the flat harness; and a pressing portion extending from the fixing portion over the flat harness so as to press the flat harness against the attachment target surface.

A flat harness attachment component according to the present disclosure includes: a fixing portion to be fixed to an attachment target member; and a pressing portion extending from the fixing portion in a state where a base end portion thereof is connected to the fixing portion, wherein the pressing portion includes a gap forming portion oriented in a direction away from the attachment target member and a main body portion that is to extend along an attachment target surface of the attachment target member.

An attachment component-equipped flat harness according to the present disclosure includes: a flat harness; and an attachment component including a fixing portion and a pressing portion, wherein the fixing portion is a portion that is fixable to an attachment target member, the fixing portion extends through one side portion side of the flat harness, and the pressing portion extends from the fixing portion to the flat harness side.

Effect of the Invention

With the present disclosure, flat harnesses of varying widths can be attached to an attachment target portion.

DETAILED DESCRIPTION TO EXECUTE THE INVENTION

Figure 1:
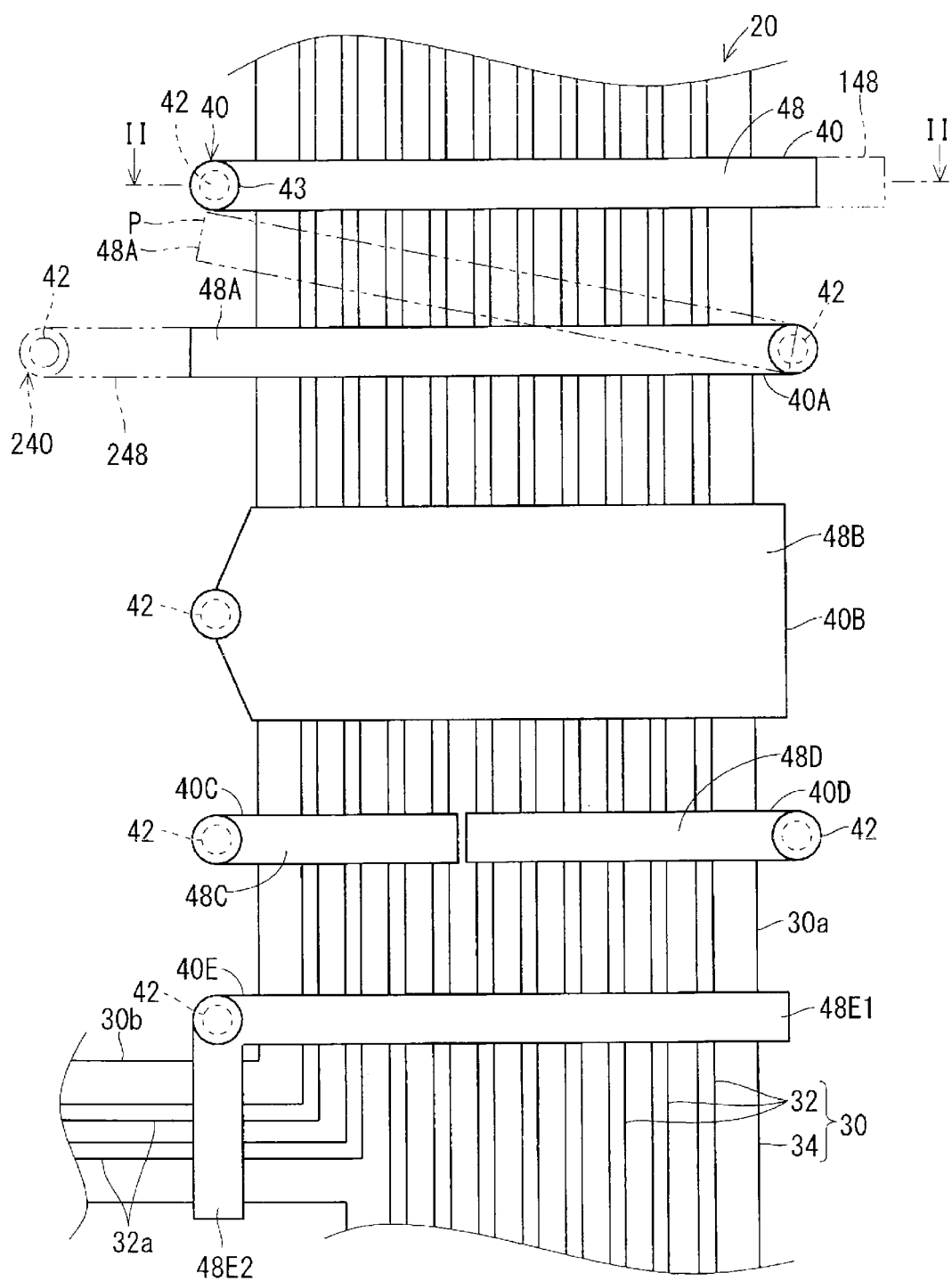
FIG. 1 is a plan view showing a flat harness attachment structure according to an embodiment.

Description of Embodiments of the Present Disclosure

First, embodiments of the present disclosure are listed and described.

The flat harness attachment structure of the present disclosure is as follows.

(1) A flat harness attachment structure to be attached to an attachment target member having an attachment target surface, including: a flat harness to be installed on the attachment target surface; a fixing portion to be fixed to the attachment target member on one side portion side of the flat harness; and a pressing portion extending from the fixing portion over the flat harness so as to press the flat harness against the attachment target surface. The fixing portion is fixed to the attachment target member on one side portion side of the flat harness. A plate shaped portion that extends over the flat harness from the fixing portion presses the flat harness against the attachment target surface. Thus, the plate shaped portion can press the flat harness against the attachment target surface regardless of the width of the flat harness. Accordingly, flat harness of various widths can be attached to the attachment target member.

(2) The pressing portion may be a plate shaped portion formed to have a flat plate shape. The plate shaped portion can stably press the flat harness.

(3) The pressing portion may be formed as one piece with the fixing portion.

(4) The pressing portion may be provided with a hole that the fixing portion extends through, and the fixing portion may be fixed to the attachment target member in a state where the fixing portion extends through the hole. The fixing portion is fixed to the attachment target member while extending through the hole. Thus, the operation of attaching the plate shaped portion and the fixing portion to each other and the operation of fixing the fixing portion to the attachment target member can be performed with ease.

(5) The pressing portion may be set to a length spanning from one side portion side of the flat harness to the other side portion. The flat harness is pressed over the entire width thereof.

(6) A plurality of sets of the fixing portion and the pressing portion may be provided. The flat harness can be attached to the attachment target member at a plurality of positions.

(7) The plurality of sets of the fixing portion and the pressing portion may include sets that are to be fixed to the attachment target member on different side portion sides of the flat harness. The flat harness is pressed from different sides along the extending direction of the flat harness.

(8) A plurality of the pressing portion may extend from one fixing portion. The flat harness can be pressed by the plurality of the pressing portion extending from one fixing portion. The plurality of fixing portions can press portions such as a bent portion and a branched portion of the flat harness.

A flat harness attachment component according to the present disclosure is as follows.

(9) A flat harness attachment component including: a fixing portion to be fixed to an attachment target member; and a pressing portion extending from the fixing portion in a state where a base end portion thereof is connected to the fixing portion, wherein the pressing portion includes a gap forming portion oriented in a direction away from the attachment target member and a main body portion that is to extend along an attachment target surface of the attachment target member. The pressing portion includes the gap forming portion and the main body portion. The gap forming portion is oriented in a direction away from the attachment target member. Thus, a gap suitable for disposing the flat harness is formed between the main body portion and the attachment target surface. With this flat harness fixing component, the flat harness can be appropriately pressed against the attachment target surface by the main body portion.

An attachment component-equipped flat harness according to the present disclosure is as follows.

(10) An attachment component-equipped flat harness including: a flat harness; and an attachment component including a fixing portion and a pressing portion, wherein the fixing portion is a portion that is fixable to an attachment target member, the fixing portion extends through one side portion side of the flat harness, and the pressing portion extends from the fixing portion to the flat harness side. The flat harness and the attachment component can be treated as one piece. Thus, when installing the flat harness to the attachment target member, the attachment component can be easily fixed to the attachment target member, and the flat harness can be easily attached.

DETAILS OF EMBODIMENTS OF THE PRESENT DISCLOSURE

Specific examples of a flat harness attachment structure, a flat harness attachment component, and an attachment component-equipped flat harness of the present disclosure will be described below with reference to the drawings. Note that the present disclosure is not limited to these illustrative examples, but is indicated by the claims, and all changes that come within the meaning and range of equivalency of the claims are intended to be embraced therein.

Embodiment

Figure 2:
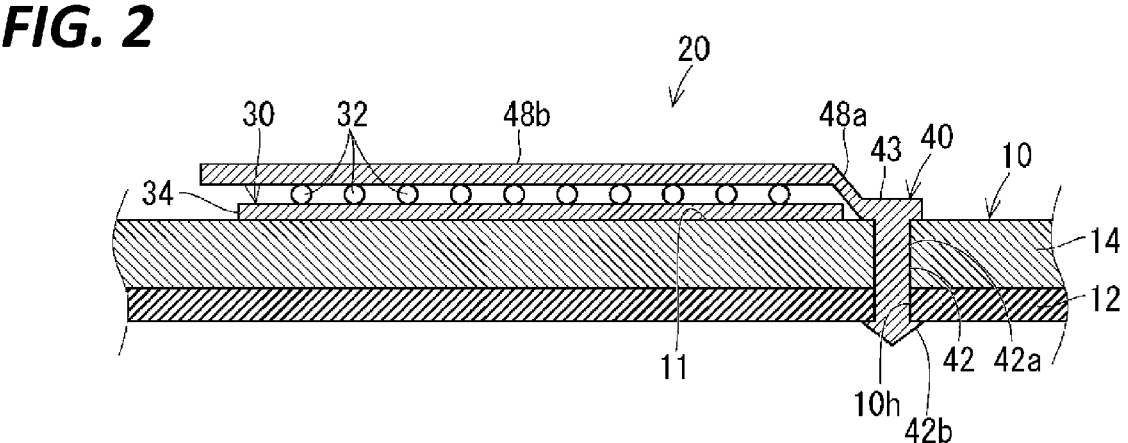
FIG. 2 is a cross-sectional view taken along line II-II in FIG. 1.

A flat harness attachment structure, a flat harness attachment component, and an attachment component-equipped flat harness according to an embodiment are described below. FIG. 1 is a plan view showing a flat harness attachment structure 20. FIG. 2 is a cross-sectional view taken along line II-II in FIG. 1.

The flat harness attachment structure 20 is a structure for attaching a flat harness 30 to an attachment target member 10 that has an attachment target surface 11.

The attachment target member 10 is envisioned as being a plate shaped portion in a vehicle, for example. The attachment target member 10 may be a flat plate shaped portion or a bent plate shaped portion. Here, the attachment target member 10 includes a plate shaped main body portion 12 and an elastic portion 14. The plate shaped main body portion 12 is a metal body or the like in a vehicle. The elastic portion 14 is a plate shaped portion that has elasticity. The elastic portion 14 is conceivably a member that is made of resin foam, a non-woven material, or the like, and acts as a cushioning material, a silencer, or the like. The elastic portion 14 is overlaid on one main surface of the plate shaped main body portion 12. In other words, the attachment target member 10 is a laminated body in which the plate shaped main body portion 12 and the elastic portion 14 are layered on each other. The flat harness 30 is installed on the outward facing surface on the elastic portion 14 side of the attachment target member 10. Thus, the outward facing surface on the elastic portion 14 side of the attachment target member 10 is the attachment target surface 11. The attachment target member 10 may be provided with an attachment hole 10h. One of the plate shaped main body 12 and the elastic portion 14 may be omitted.

The flat harness attachment structure 20 includes the flat harness 30, a fixing portion 42, and a plate shaped portion 48 serving as a pressing portion.

The flat harness 30 includes a plurality of linear wiring members, and is formed having an overall flat shape. Here, the flat harness 30 includes electric wires 32 and a sheet 34.

The electric wires 32 are examples of linear wiring members. Each electric wire 32 includes a core wire and a coating. Each core wire is a linear conductor formed of a conductive material such as metal. Each coating is an electric insulating portion that surrounds the corresponding core wire. The linear wiring members may be linear members for transmitting electricity, light, or the like. For example, the linear wiring members may be bare conductive wires, shielded wires, twisted wires, enamel wires, nichrome wires, optical fibers, or the like, instead of electric wires.

The sheet 34 is a sheet shaped member that keeps the electric wires 32 in a flat form. The sheet 34 is made of resin or the like. The sheet 34 may include metal. The sheet 34 may include a non-woven sheet. The electric wires 32 are fixed to the one main surface of the sheet 34, parallel to each other. The electric wires 32 are fixed to the sheet 34 through welding, bonding, adhesion, or the like. The welding may be ultrasonic welding or thermal welding. As a result of the electric wires 32 being fixed to the one main surface of the sheet 34, the electric wires 32 are kept in a flat state.

The flat harness 30 may be branched according to the positions of electric components that are to be connected thereto. FIG. 1 shows an example where electric wires 32a, which are a portion of the electric wires 32, are branched outward. In this case, the sheet 34 may be formed so as to branch along the path of the electric wires 32a. The portion of the flat harness 30 provided with the most electric wires 32 may be referred to as a trunk wire portion 30a in the following description. Also, the portion where the aforementioned electric wires 32a are branched may be referred to as a branch wire portion 30b in the following description. An end portion of each electric wire 32 is to be connected to an electric component or the like via a connector or the like. A plurality of layers of the electric wires 32 may be layered on the sheet 34.

The flat harness 30 is not limited to the above example. A plurality of electric wires may be kept in a flat state by a flat frame member or the like. A plurality of electric wires arranged parallel to each other so as to obtain a flat shape may be directly joined to each other. Also, the flat harness 30 may be kept in a flat state in a state where a plurality of linear conductors are electrically insulated from each other by an electric insulating member, such as in the case of a flexible printed circuit (FPC). That is, the flat harness may be a wiring member in which a plurality of linear conductors are retained in a flat state where they are electrically insulated from each other, and the thickness thereof is smaller than the width overall.

The flat harness 30 is installed on the attachment target surface 11 in a horizontal orientation to the attachment target surface 11. Here, the electric wires 32 are positioned on the opposite side to the attachment target surface 11, relative to the sheet 34. The electric wires 32 may be positioned on the attachment target surface 11 side, relative to the sheet 34.

The fixing portion 42 is a portion to be fixed to the attachment target member 10 on one side portion side of the flat harness 30. The plate shaped portion 48 is a portion that extends over the flat harness 30 from the fixing portion 42 so as to press the flat harness 30 against the attachment target surface 11. In the present embodiment, the plate shaped portion 48 is formed in one piece with the fixing portion 42. More specifically, the plate shaped portion 48 and the fixing portion 42 are formed as one piece using a mold by pouring a molten resin into the mold. Thus, the plate shaped portion 48 and the fixing portion 42 are integrally joined without an interface. The fixing portion 42 and the plate shaped portion 48 formed as one piece may be referred to as a flat harness attachment component 40. Here, an example where a pressing portion is plate shaped portion extending in a band shape is described. The pressing portion may have a round bar shape, a square bar shape, a triangle bar shape, or the like.

More specifically, the fixing portion 42 is configured to be fittable to the attachment hole 10h provided in the attachment target member 10, in a retained state. The fixing portion 42 includes, for example, a long main body portion 42a and a catch portion 42b. The long main body portion 42a is formed to be long enough to reach the rear surface side of the attachment target member 10 when inserted into the attachment hole 10h. The catch portion 42b is formed protruding outward from the leading end portion of the long main body portion 42a, and is configured to be able to catch on the rear surface side of the attachment target member 10, at a circumferential edge portion of the attachment hole 10h. The catch portion 42b can, for example, use an elastically deformable structure that utilizes a plate spring shape or the like to be able to elastically deform from a protruding state where it can catch on the circumferential edge portion of the attachment hole 10h to a retracted state in which it can pass through the attachment hole 10h. A known configuration such as a harness clipp, a harness clamp, a push rivet, and the like may be employed as the configuration of the fixing portion 42.

A head portion 43 that juts outward is provided at the base end portion of each fixing portion 42. Here, the head portion 43 is formed in the shape of a disc that juts out around the entire circumferential direction of the base end portion of the fixing portion 42. In a state where the fixing portion 42 is inserted into the attachment hole 10h, the head portion 43 is caught on the circumferential edge portion of the opening on the one side (the attachment target surface 11 side) of the attachment hole 10h, and the catch portion 42b is caught on the circumferential edge portion of the opening on the other side of the attachment hole 10h. In this state, the elastic portion 14 may be in a compressed state. In this case, the head portion 43 is continuously pushed in a direction away from the plate shaped main body portion 12 under the elastic restoring force of the elastic portion 14. Thus, the fixing portion 42 is unlikely to be inclined, and the orientation of the flat harness attachment component 40 is stable.

The plate shaped portion 48 extends outward from the base end portion of the fixing portion 42, away from the axial direction of the fixing portion 42. Here, the base end portion of the plate shaped portion 48 is connected to the base end portion of the fixing portion 42. The plate shaped portion 48 includes a gap forming portion 48a and a main body portion 48b. The gap forming portion 48a is formed to be oriented in a direction away from the attachment target member 10, from the portion where it is connected to the base end portion of the fixing portion 42. Here, the gap forming portion 48a is inclined to be oriented further in the opposite direction to the leading end portion of the fixing portion 42 the further outward it faces from a portion of the circumference of the head portion 43. The main body portion 48b extends along the attachment target surface 11 from the leading end portion of the gap forming portion 48a. Here, the main body portion 48b is formed in an elongated plate shape. The main body portion 48b extends from the leading end portion of the gap forming portion 48a in a direction away from the fixing portion 42 while being orthogonal to the axial direction of the fixing portion 42. Thus, between the inner face of the head portion 43 and the inner face of the main body portion 48b, a difference in position corresponding to the amount of incline of the gap forming portion 48a can be generated in a direction extending along the axial direction of the fixing portion 42. In a state where the fixing portion 42 is fixed to the attachment target member 10, the inner face of the head portion 43 is in contact with the attachment target surface 11. In this state, a gap that corresponds to the incline of the gap forming portion 48a is formed between the main body portion 48b and the attachment target surface 11. The flat harness 30 is installed in this gap. It is preferable that the above gap is smaller than the thickness of the flat harness 30 (a dimension obtained by adding the diameter of an electric wire 32 to the thickness of the sheet 34). Accordingly, the main body portion 48b can more reliably press the flat harness 30. The above gap forming portion 48a does not necessarily have to be inclined relative to the fixing portion 42, and may be formed in the shape of a crank.

Figure 3:
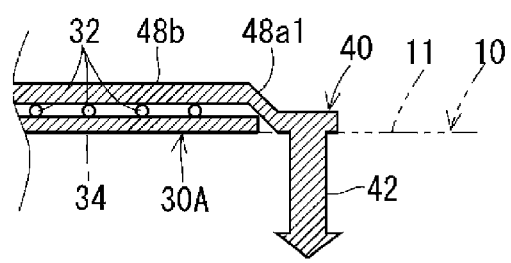
FIG. 3 is a cross-sectional view showing a flat harness attachment component according to a variation.
Figure 4:
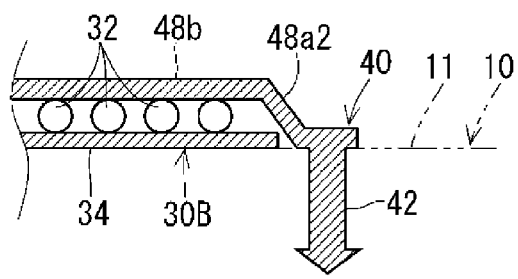
FIG. 4 is a cross-sectional view showing a flat harness attachment component according to a variation.

Here, the thickness of the flat harness 30 that is to be attached can be changed according to the diameter of the electric wires 32, the thickness of the sheet 34, or the like. The aforementioned gap forming portion 48a may be configured according to the thickness of the flat harness 30 that is to be attached. For example, as shown in FIG. 3, if the thickness of a flat harness 30A is comparatively small, the incline of a gap forming portion 48a1 may be set to be small. Accordingly, a configuration can be obtained where, in a direction extending along the axial direction of the fixing portion 42, the difference between the inner face of the head portion 43 and the inner face of the main body portion 48b is small, and that is suitable for pressing the flat harness 30A with a comparatively small thickness. Also, as shown in FIG. 4, in the case of a flat harness 30B with a comparatively large thickness, the incline of a gap forming portion 48a2 may be set to be large, for example. Accordingly, a configuration can be obtained where, in a direction extending along the axial direction of the fixing portion 42, the difference between the inner face of the head portion 43 and the inner face of the main body portion 48b can be made large, and that is suitable for pressing the flat harness 30B with a comparatively large thickness.

The length of the plate shaped portion 48 is preferably set to the length from the one side portion of the flat harness 30 to the other side portion. In the present embodiment, the fixing portion 42 is fixed to the attachment target member 10 at a position outside of the one side portion of the flat harness 30. Thus, the length of the plate shaped portion 48 is preferably greater than or equal to the width of the flat harness 30. As described later, there are cases where the fixing portion 42 extends through the side portion on the one side of the flat harness 30, on the inner side of the edge of the side portion that it extends through. In this case, even if the length of the plate shaped portion 48 is smaller than the width of the flat harness 30, the length of the plate shaped portion 48 can be set to the length from the one side portion of the flat harness 30 to the other side portion. Note that the length of the plate shaped portion 48 may be set to a length from the one side portion of the flat harness 30 to a position short of the other side portion. Here, an example where the plate shaped portion 48 is oriented along the width direction of the flat harness 30 has been described. However, the plate shaped portion 48 may be oriented diagonal to the width direction of the flat harness 30.

A plurality of sets each including a fixing portion and a plate shaped portion may be provided. FIG. 1 shows, in addition to the flat harness attachment component 40 including the above fixing portion 42 and plate shaped portion 48, flat harness attachment components 40A, 40B, 40C, 40D, and 40E.

The flat harness attachment component 40A is a component that includes a similar fixing portion 42 and plate shaped portion 48 to that of the flat harness attachment component 40. Focusing on the flat harness attachment components 40 and 40A, the flat harness attachment component 40 and the flat harness attachment component 40A are fixed to the attachment target member 10 on different side portion sides of the flat harness 30. The flat harness attachment portions 40 and 40A are provided at different positions in the extending direction of the flat harness 30.

More specifically, regarding the flat harness attachment component 40, the fixing portion 42 is fixed to the attachment target member 10 on the one side portion side (here, on the outside of the side portion) of the flat harness 30. The flat plate portion 48 horizontally spans the flat harness 30 from the one side portion of the flat harness 30 toward the other side portion.

The flat harness attachment component 40A is provided at a position that is adjacent to and spaced apart from the flat harness attachment component 40 in the extending direction of the flat harness 30. The orientation of the flat harness attachment component 40A is symmetrical to the above flat harness attachment component 40 with respect to the center line in the width direction of the flat harness 30. That is, the fixing portion 42 is fixed to the attachment target member 10 on the other side portion side (here, on the outside of the side portion) of the flat harness 30. A plate shaped portion 48A horizontally spans the flat harness 30 from the other side portion of the flat harness 30 toward the one side portion.

Here, the plate shaped portions 48 and 48A of the flat harness attachment components 40 and 40A extend from different side portions of the flat harness 30 and press the flat harness 30 at different positions along the extending direction of the flat harness 30. It is conceivable that each flat harness attachment component 40 and 40A can effectively press the flat harness 30 on the side near the corresponding fixing portion 42. Thus, the flat harness 30 is effectively pressed against the attachment target surface 11 over a certain range. If the number of provided flat harness attachment components 40 and 40A is increased, the fixing portions 42 may be alternately disposed on the two side portions of the flat harness 30.

A flat harness attachment component 40B includes a fixing portion 42 and a plate shaped portion 48B. The fixing portion 42 has a similar configuration to that described above.

The plate shaped portion 48B is formed wider than the above plate shaped portion 48. The flat harness 30 is protected by the plate shaped portion 48B as a result of the plate shaped portion 48B being formed wide. For example, if there is an edge shaped portion or the like near a portion of the flat harness 30, it is preferable to provide this flat harness attachment component 40B. The width of the plate shaped portion 48B can be appropriately set according to the region for which protection is desired. For example, the plate shaped portion 48B may be set to have a greater width than the width of the fixing portion 42. The width of the fixing portion 42 is a length in the direction that is orthogonal to both the axial direction of the fixing portion 42 and the extending direction of the plate shaped portion 48B. Also, the plate shaped portion 48B may be set to have a larger width than the width of the flat harness 30.

A flat harness attachment component 40C includes a fixing portion 42 and a plate shaped portion 48C. The fixing portion 42 has a similar configuration to that described above. The plate shaped portion 48C is shorter than the above plate shaped portions 48. A flat harness attachment component 40D includes a fixing portion 42 and a plate shaped portion 48D. The fixing portion 42 has a similar configuration to that described above. The plate shaped portion 48D is shorter than the above plate shaped portions 48.

Focusing on the flat harness attachment components 40C and 40D, the flat harness attachment component 40C and the flat harness attachment component 40D are fixed to the attachment target member 10 on different side portion sides of the flat harness 30. Also, the flat harness attachment components 40C and 40D are provided at the same position in the extending direction of the flat harness 30.

More specifically, the fixing portion 42 of the flat harness attachment component 40C is fixed to the attachment target member 10 on the one side portion side (here, on the outside of the side portion) of the flat harness 30. The plate shaped portion 48 extends from the one side portion of the flat harness 30 to a position short of the other side portion.

The flat harness attachment component 40D is provided at the same position as the flat harness attachment component 40C in the extending direction of the flat harness 30. The orientation of the flat harness attachment component 40D is symmetrical to the above flat harness attachment component 40C relative to the center line in the width direction of the flat harness 30. That is, the fixing portion 42 is fixed to the attachment target member 10 on the other side portion side (here, on the outside of the side portion) of the flat harness 30. The plate shaped portion 48 extends from the other side portion of the flat harness 30 to a position short of the one side portion.

Thus, the plate shaped portion 48C of the flat harness attachment component 40C and the plate shaped portion 48D of the flat harness attachment component 40D are aligned on one straight line horizontally spanning the flat harness 30. Also, the plate shaped portions 48C and 48D oppose each other at an intermediate portion in the width direction of the flat harness 30. The plate shaped portions 48C and 48D may have the same or different lengths.

Here, the plate shaped portions 48C and 48D of the flat harness attachment components 40C and 40D extend from different side portions of the flat harness 30 at the same position in the extending direction of the flat harness 30 while pressing the flat harness 30. It is conceivable that the flat harness attachment components 40C and 40D can effectively press the flat harness 30 at sides close to the fixing portions 42. Thus, both side portions of a portion of the flat harness 30 can be effectively pressed against the attachment target surface 11.

A flat harness attachment component 40E includes a fixing portion 42, a plate shaped portion 48E1, and a plate shaped portion 48E2. The fixing portion 42 has a similar configuration to that described above.

The plate shaped portion 48E1 and the plate shaped portion 48E2 have a similar configuration to the aforementioned plate shaped portion 48. The lengths of the plate shaped portion 48E1 and the plate shaped portion 48E2 are set according to the width and the like of the flat harness 30 that is to be pressed.

A plurality of plate shaped portions 48E1 and 48E2 extend from one fixing portion 42. The plate shaped portion 48E1 is a portion that presses the trunk wire portion 30a of the flat harness 30. This plate shaped portion 48E1 is set to be longer than or equal to the width of the trunk wire portion 30a. The plate shaped portion 48E2 is a portion that presses the branch wire portion 30b of the flat harness 30. This plate shaped portion 48E2 is set to be longer than or equal to the width of the branch wire portion 30b.

The fixing portion 42 is fixed to the attachment target member 10 at a position outside of a portion where one side of the trunk wire portion 30a and one side of the branch wire portion 30b intersect. The branch wire portion 30b extends in an orthogonal orientation relative to the trunk wire portion 30a. The plate shaped portion 48E1 and the plate shaped portion 48E2 extend in orientations orthogonal to each other. Thus, the plate shaped portion 48E1 presses the trunk wire portion 30a in an orientation horizontally spanning the trunk wire portion 30a. Also, the plate shaped portion 48E2 presses the branch wire portion 30b in an orientation horizontally spanning the branch wire portion 30b.

The angle formed by the plate shaped portion 48E1 and the plate shaped portion 48E2 can be changed according to an angle or the like formed by the trunk wire portion 30a and the branch wire portion 30b. Three or more plate shaped portions may extend from the fixing portion 42. The plate shaped portion 48E1 and the plate shaped portion 48E2 can not only press a portion where the flat harness 30 is branched, but also press the flat harness 30 at portions on the front and rear side of a bent portion where the flat harness 30 is bent.

The lengths of the plate shaped portions 48, 48A, 48B, 48C, 48D, 48E1 and 48E2 of the above flat harness attachment components 40, 40A, 40B, 40C, 40D, and 40E may each be set to a length that corresponds to the width of a portion of the flat harness 30 that is to be pressed.

In this case, the plate shaped portions 48, 48A, 48B, 48C, 48D, 48E1 and 48E2 may be plate shaped portions that correspond to the width of the portion of the flat harness 30 that is to be pressed, the plate shaped portions being manufactured through die molding or the like. Also, for example, a plate shaped portion with a length corresponding to the envisioned maximum width may be manufactured as the plate shaped portion 148, the maximum width being envisioned for the flat harness 30 that is envisioned as being a pressing target (see the plate shaped portion 148 shown with the two dot-chain line in FIG. 1). Also, in this case, the leading end portion of the plate shaped portion 148 may be removed according to the width of the flat harness 30 to form a plate shaped portion 48 with a desired length. The leading end portion of the plate shaped portion 148 may be removed through cutting using a blade, folding, or the like.

Also, for example, a flat harness attachment component in which a fixing portion 42 is provided at two end portions of a plate shaped portion 248 may be manufactured as a flat harness attachment component 240 (see the flat harness attachment component 240 illustrated with a two dot-chain line in FIG. 1). In this case, the flat harness attachment component 40A provided with a plate shaped portion 48 of a desired length can be manufactured by separating the intermediate portion of the plate shaped portion 248. The above flat harness attachment component 240 can be used as is as a component that presses the flat harness 30.

With the present embodiment, a fixing portion 42 is fixed to the attachment target member 10 on the end portion side of one side of the flat harness 30. The plate shaped portions 48, 48B, 48C, 48D, 48E1, and 48E2 extending over the flat harness 30 from the corresponding fixing portions 42 press the flat harness 30 against the attachment target surface 11. Thus, a plate shaped portion 48 can press the flat harness 30 against the attachment target surface 11 regardless of the width of the flat harness 30. Accordingly, flat harnesses 30 of varying widths can be attached to the attachment target member 10.

Also, a configuration may be employed where fixing portions 42 are only provided on one end portion side of the plate shaped portions 48, 48B, 48C, 48D, 48E1, and 48E2, and the attachment target member 10 is provided with attachment holes 10h provided only on the one end portion side of the plate shaped portions 48, 48B, 48C, 48D, 48E1, and 48E2. Thus, the attachment workability is improved, and the sound insulating properties of the attachment target member 10 are improved.

Also, the plate shaped portions 48, 48B, 48C, 48D, 48E1, and 48E2 press the electric wires 32 and 32a against the sheet 34. Thus the electric wires 32 and 32a can be kept from rising from the sheet 34.

Each of the plate shaped portions 48, 48B, 48C, 48D, 48E1, and 48E2 is formed as one piece with a fixing portion 42, and thus the number of components is reduced. The number of components required when attaching the flat harness 30 to the attachment target member 10 can be reduced, and thus the flat harness 30 can be easily attached.

Also, only one end portion of each of the plate shaped portions 48, 48B, 48C, 48D, 48E1, and 48E2 is fixed via the corresponding fixing portion 42. Thus, the plate shaped portions 48, 48B, 48C, 48D, 48E1, and 48E2 can be removed according to the width of the flat harness 30 or used in a state where an end portion thereof extends past the intermediate portion in the width direction or to the outer side of the flat harness 30. Accordingly, the number of types of the flat harness attachment components 40, 40A, 40B, 40C, 40D, and 40E can be reduced, and manufacturing control of components is easy.

Also, because the plate shaped portions 48, 48B, 48E1, and 48E2 are configured to press the flat harness 30 over the entire width thereof, the flat harness 30 is unlikely to rise from the attachment target surface 11.

Furthermore, a plurality of the flat harness attachment components 40, 40A, 40B, 40C, 40D, and 40E are provided, and thus the flat harness 30 can be pressed at a plurality of positions.

The flat harness attachment components 40 and 40A are fixed to the attachment target member 10 on different side portion sides of the flat harness 30. Also, the flat harness attachment components 40C and 40D are fixed to the attachment target member 10 on different side portion sides of the flat harness 30. The flat harness attachment components 40 and 40A and the flat harness attachment components 40C and 40D can more firmly press the flat harness 30 from the fixing portion 42 sides. By dispersing the fixing positions on both sides of the flat harness 30, the flat harness 30 can be firmly pressed from both sides thereof.

If the above fixing positions are at different positions in the extending direction of the flat harness 30, the flat harness 30 can be firmly pressed from both sides over a comparatively large range. If the above fixing positions are at the same position in the extending direction of the flat harness 30, the flat harness 30 can be firmly pressed from both sides at local positions.

Also, the plate shaped portion 48 includes the gap forming portion 48a and the main body portion 48b. The gap forming portion 48a is oriented in a direction away from the attachment target member 10. Thus, a gap suitable for disposing the flat harness 30 between the main body portion 48b and the attachment target surface 11 is formed. In particular, the gap forming portion 48a keeps the main body portion 48b in a horizontal orientation relative to the attachment target surface 11. Accordingly, in a state where the main body portion 48b is in contact with the flat harness 30 over the entire width thereof, the flat harness 30 can be appropriately pressed against the attachment target surface 11.

Also, in the flat harness attachment component 40E, a plurality of plate shaped portions 48E1 and 48E2 extend in different directions from one fixing portion 42. The plate shaped portions 48E1 and 48E2 can press portions (here, the trunk wire portion 30a and the branch wire portion 30b) of the flat harness 30 along different directions. The plate shaped portions 48E1 and 48E2 extend in different directions, and thus the bent portion of the flat harness 30 can also be pressed. Thus, the flat harness attachment component 40E can press the branched portion and bent portion of the flat harness 30, and accordingly, the paths of the branched portion and the bent portion can be kept constant to a certain extent.

Variations

Variations will be described below on the premise of the above embodiment.

It is preferable that rotation of the flat harness attachment components 40, 40A, 40B, 40C, 40D, and 40E around their fixing portions 42 is limited.

Therefore, in the case where the flat harness attachment components 40 and 40A are provided adjacent to each other, the length of the plate shaped portion 48A of the flat harness attachment component 40A is preferably set to a length with which it can come into contact with the adjacent flat harness attachment component 40 (see orientation P of the plate shaped portion 48A indicated by the two dot-chain line in FIG. 1). The plate shaped portion 48A is preferably long enough to be able to come into contact with the fixing portion 42 of the flat harness attachment component 40. Accordingly, rotation of the plate shaped portion 48A is limited, and the plate shaped portion 48A is kept in a state where it presses the flat harness 30.

Figure 5:
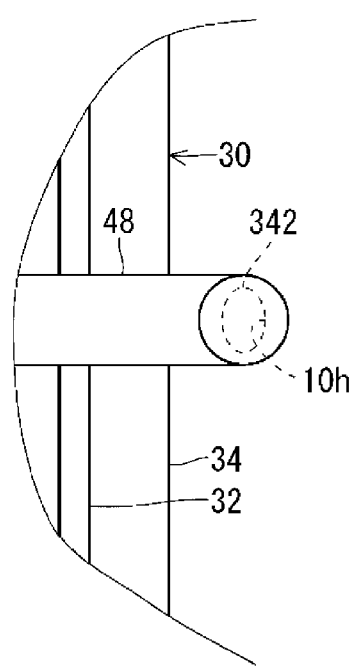
FIG. 5 is a partial plan view showing a flat harness attachment component according to a variation.

Also, as shown in FIG. 5, the cross section (a cross section orthogonal to the axial direction) of a fixing portion 342 corresponding to the fixing portion 42 may be formed to have a non-circular shape (for example, an oval or a square, an oval being shown as an example in FIG. 5) or the like. In this case, the attachment hole 10h may be formed in a non-circular shape that corresponds to the cross-sectional shape of the fixing portion 342. Accordingly, rotation of the fixing portion 342 is limited in a state where the fixing portion 342 is inserted into the attachment hole 10h. Thus, turning of the plate shaped portion 48 is limited, and the plate shaped portion 48 is kept pressing the flat harness 30.

Figure 6:
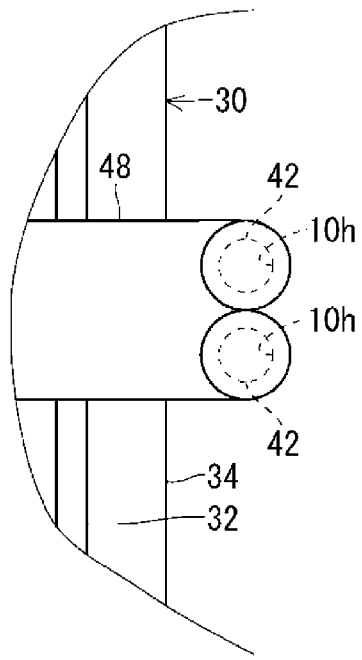
FIG. 6 is a partial plan view showing a flat harness attachment component according to a variation.

Also, as shown in FIG. 6, a plurality (two here) of fixing portions 42 may be provided at one end portion of the plate shaped portion 48. The fixing portions 42 may be aligned in the width direction of the plate shaped portion 48 or aligned in the extending direction of the plate shaped portion 48. The former is shown in FIG. 6. Even if this is the case, the fixing portions 42 are fixed to the attachment target member 10 at fixed positions, and thus turning of the plate shaped portion 48 is limited. Thus, the plate shaped portion 48 is kept pressing the flat harness 30.

Figure 7:
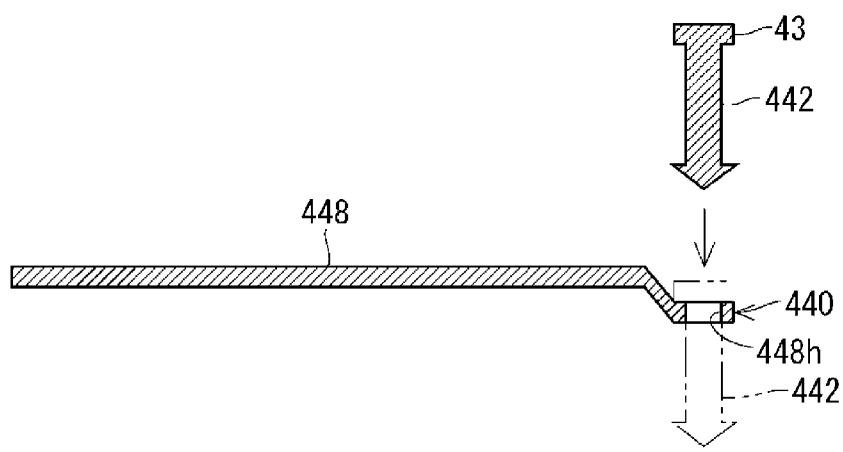
FIG. 7 is a cross-sectional view showing a flat harness attachment component according to a variation.

As shown in FIG. 7, in a flat harness attachment component 440, a plate shaped portion 448 corresponding to the plate shaped portion 48 and a fixing portion 442 corresponding to the fixing portion 42 may be separate bodies.

In this case, the plate shaped portion 448 is provided with a hole 448h at the base end portion of a portion corresponding to the above plate shaped portion 48. The fixing portion 442 is inserted into and fixed to the attachment hole 10h of the attachment target member 10 in a state of extending through the hole 448h. The base end portion of the plate shaped portion 448 can extend from the fixing portion 442 to the flat harness 30 side while being sandwiched between the attachment target member 10 and the head portion 43.

As described above, it is preferable to form the fixing portion 442 so as to have a non-circular (for example, an oval or a square) cross-sectional shape in order to limit rotation of the fixing portion 442, and to form the attachment hole 10h so as to have a non-circular cross-sectional shape that corresponds to the cross-sectional shape of the fixing portion 442. Also, it is preferable to form the fixing portion 442 so as to have a non-circular cross-sectional shape in order to limit turning of the plate shaped portion 448 relative to the fixing portion 442, and to form the hole 448h so as to have a non-circular cross-sectional shape that corresponds to the cross-sectional shape of the fixing portion 442.

Accordingly, when the fixing portion 442 is fixed to the attachment target member 10 while extending through the hole 448h, the plate shaped portion 448 is attached to the fixing portion 442. Thus, the operation of attaching the plate shaped portion 448 and the fixing portion 442 to each other and the operation of fixing the fixing portion 442 to the attachment target member 10 can be performed with ease.

In this case, a plurality of plate shaped portions that correspond to the width of the flat harness 30 may be prepared as plate shaped portions 448. Alternatively, the plate shaped portions 448 may be formed by appropriately removing plate shaped portions according to the width of the flat harness 30 that is to be pressed.

Also, a configuration may be employed in which an end portion of the plate shaped portion 448 is provided with a plurality of holes, and a fixing portion 442 extends through each of the holes. Accordingly, one end portion of the plate shaped portion 448 is fixed at a plurality of positions, and turning of the plate shaped portion 448 is limited.

Figure 8:
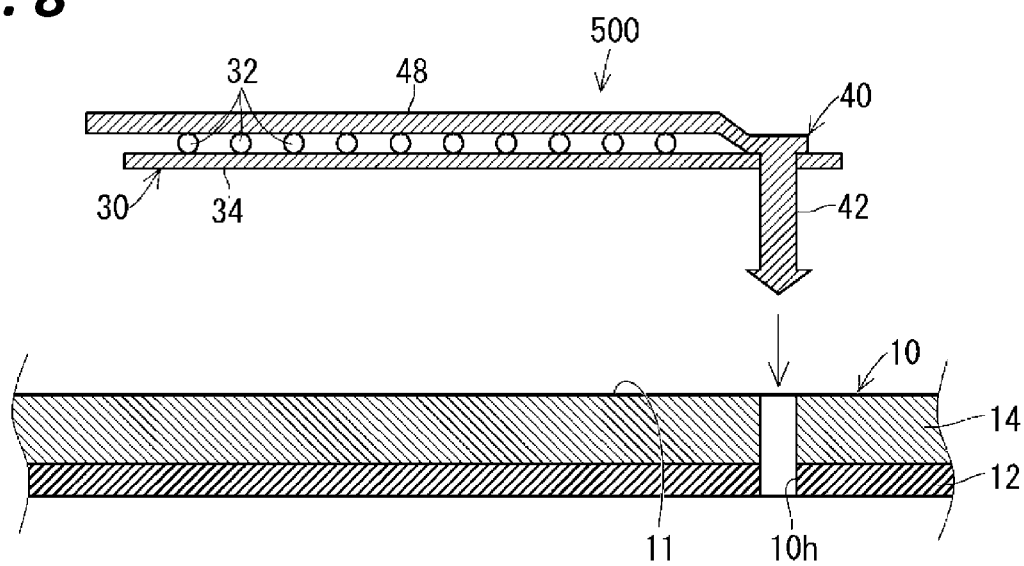
FIG. 8 is a cross-sectional view showing an attachment component-equipped flat harness according to a variation.

As shown in FIG. 8, the fixing portion 42 of the flat harness attachment component 40 may extend through one side portion of the flat harness 30. Here, the fixing portion 42 extends through the sheet 34 of the flat harness 30. The fixing portion 42 is inserted into the attachment hole 10h of the attachment target member 10 and fixed to the attachment target member 10, in a state of extending through the flat harness 30. With this example, the fixing portion 42 itself can press a side portion of the flat harness 30. Thus, the flat harness 30 is firmly attached to the attachment target member 10.

An attachment component-equipped flat harness in which a fixing portion 42 extends through a side portion of the above flat harness 30 may be considered as an attachment component-equipped flat harness 500.

The fixing portion 442 and the plate shaped portion 448 may be attached to the flat harness 30 as separate bodies (see FIG. 7). In this case, it is sufficient that the fixing portion 442 extends through the hole 448h of the plate shaped portion 448 and extends through the flat harness 30.

The attachment component-equipped flat harness 500 is provided in a form where the flat harness 30 and the flat harness attachment component 40 are formed in one piece, and an operation is performed to attach the integrated flat harness 30. Thus, the attachment operation of the flat harness 30 using the flat harness attachment component 40 can be performed with ease.

Note that the configurations of the above embodiments and variations can be suitably combined, provided that no mutual contradiction arises. For example, a portion of the flat harness attachment components 40, 40A, 40B, 40C, 40D, and 40E may be formed as one part, and the rest may be separately configured components. Also, a portion of the flat harness attachment components 40, 40A, 40B, 40C, 40D, and 40E may extend through a side portion of the flat harness 30, and the rest may be fixed to the attachment target member 10 without extending through the flat harness 30.

LIST OF REFERENCE NUMERALS

10 Attachment target member
10h Attachment hole
11 Attachment target surface
12 Plate shaped main body portion
14 Elastic portion
20 Flat harness attachment structure
30, 30A, 30B Flat harness
30a Trunk wire portion
30b Branch wire portion
32, 32a Electric wire
34 Sheet
40, 40A, 40B, 40C, 40D, 40E Flat harness attachment component
42 Fixing portion
42a Long main body portion
42b Catch portion
43 Head portion
48, 48A, 48B, 48C, 48D, 48E1, 48E2 Plate shaped portion
48a, 48a1, 48a2 Gap forming portion
48b Main body portion
148 Plate shaped portion
240 Flat harness attachment component
248 Plate shaped portion
342 Fixing portion
440 Flat harness attachment component
442 Fixing portion
448 Plate shaped portion
448h Hole
500 Attachment component-equipped flat harness
P Orientation

What is claimed is:

1. A flat harness attachment structure to be attached to an attachment target member having an attachment target surface, comprising:
   a flat harness to be installed on the attachment target surface;
   a fixing portion to be fixed to the attachment target member on one side portion side of the flat harness; and
   a pressing portion extending from the fixing portion over the flat harness so as to press the flat harness against the attachment target surface,
   wherein a plurality of sets of the fixing portion and the pressing portion are provided, and
   the plurality of sets of the fixing portion and the pressing portion include sets that are to be fixed to the attachment target member on different side portion sides of the flat harness and at different positions in an extending direction of the flat harness.

2. The flat harness attachment structure according to claim 1, wherein the pressing portion is a plate shaped portion formed to have a flat plate shape.

3. The flat harness attachment structure according to claim 1, wherein the pressing portion is formed as one piece with the fixing portion.

4. The flat harness attachment structure according to claim 1, wherein the pressing portion is provided with a hole that the fixing portion extends through, and
   the fixing portion is to be fixed to the attachment target member in a state where the fixing portion extends through the hole.

5. The flat harness attachment structure according to claim 1, wherein the pressing portion is set to a length spanning from one side portion side of the flat harness to the other side portion.

6. The flat harness attachment structure according to claim 1, wherein the pressing portion extends from one fixing portion in a plurality of directions.

7. A flat harness attachment component comprising:
   a fixing portion to be fixed to an attachment target member, the fixing portion including an elongated main body portion, a catch portion provided at a leading end portion of the elongated main body portion, and a head portion provided at a base end portion of the elongated main body portion; and a pressing portion extending from the fixing portion in a state where a base end portion thereof is connected to the base end portion of the fixing portion, wherein the pressing portion includes a gap forming portion oriented in a direction away from the attachment target member and a main body portion that is to extend along an attachment target surface of the attachment target member.

8. An attachment component-equipped flat harness comprising:

a flat harness including a plurality of linear wiring members and a sheet shaped member that holds the plurality of linear wiring members in a flat form; and an attachment component including a fixing portion and a pressing portion, wherein the fixing portion is a portion that is fixable to an attachment target member, the fixing portion extends through the sheet shaped member of the flat harness, and the pressing portion extends from the fixing portion to the flat harness side.

* * * * *